July 23, 1940.  L. DE FLOREZ  2,208,666
AERONAUTICAL INSTRUMENT
Filed Oct. 8, 1937  2 Sheets-Sheet 2
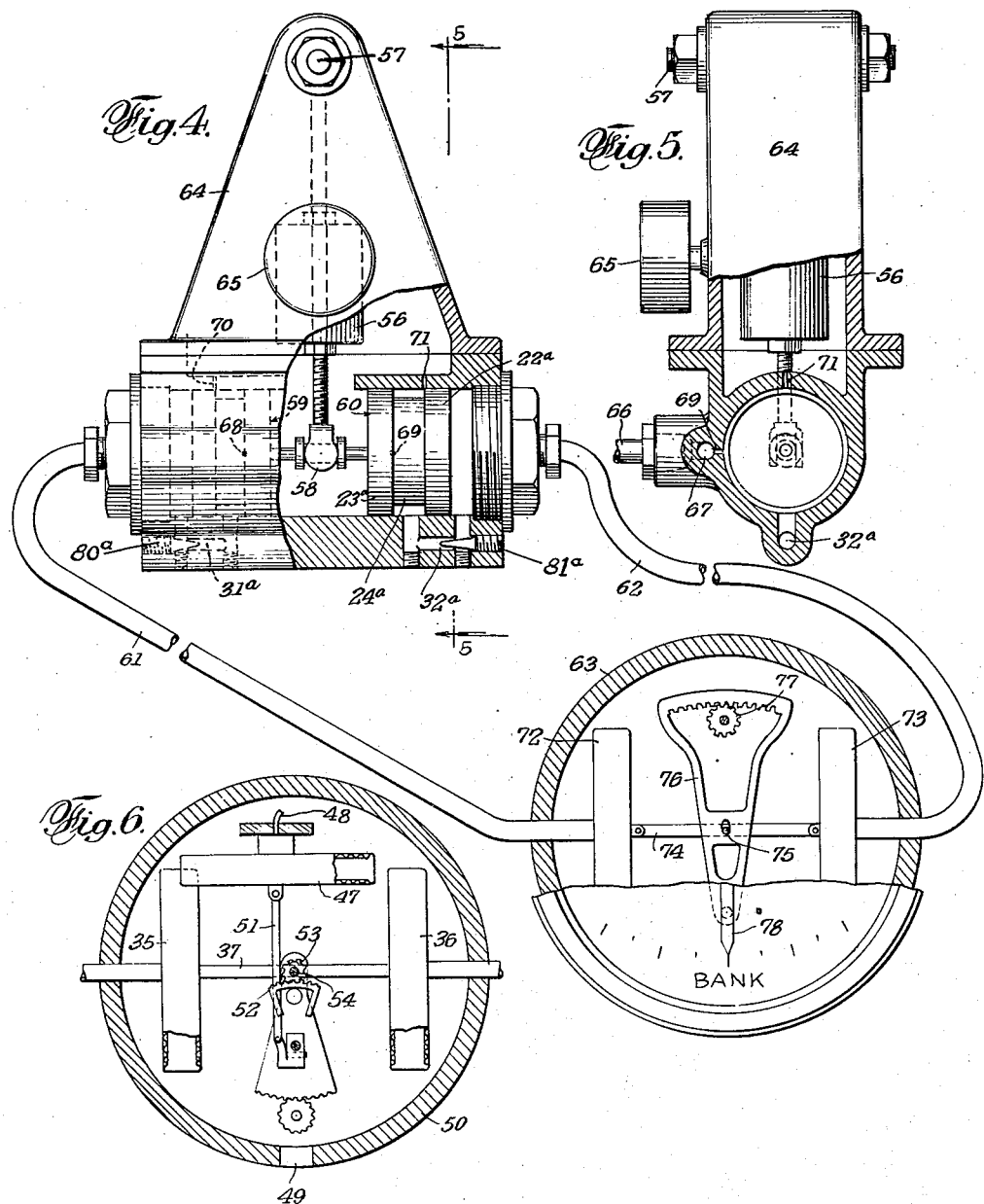
LUIS DE FLOREZ
INVENTOR Patented July 23, 1940

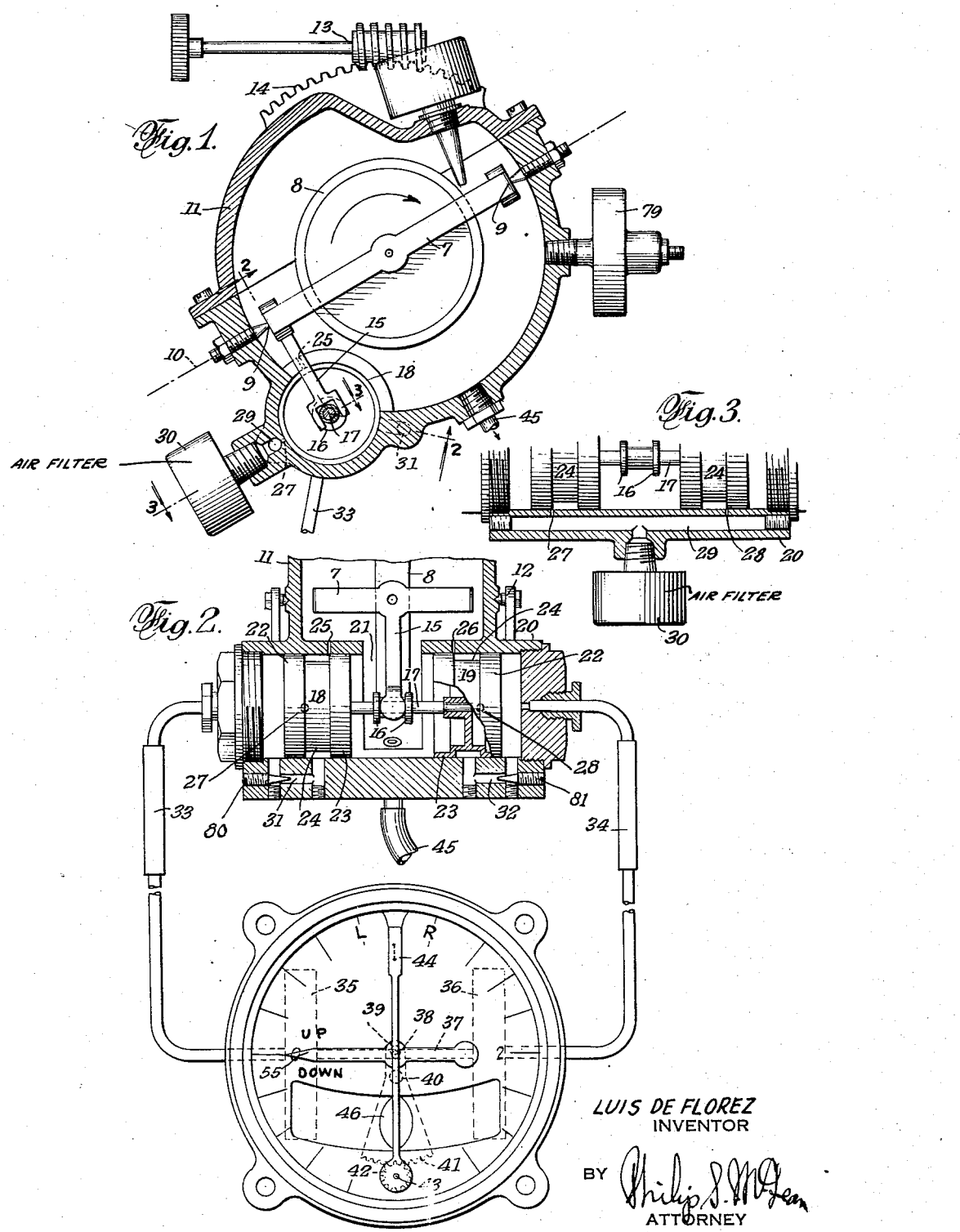

2,208,666

UNITED STATES PATENT OFFICE 2,208,666

AERONAUTICAL INSTRUMENT

Luis de Florez, New York, N. Y.

Application October 8, 1937, Serial No. 168,007

2 Claims. (Cl. 33—204)

The present invention relates to aircraft instruments.

One of the objects of the invention is to combine certain of the more essential or generally used instruments in a single unit, so that average flying may be accomplished by reference only to this one instrument.

Particularly it is an object to combine in practical fashion the functions of such instruments as the bank and turn and the pitch and climb indicators.

Another object is to attain more effective and reliable indication through measurement of the force rather than the motion resulting from deviation. Thus in the case of a rate of turn gyroscope, as the angle increases, the rate of movement diminishes, the gyroscope becoming less sensitive as it swings from the normal plane through the complete angle of precession. By restraining the frame of the gyroscope and converting the precessional force into pressure in place of motion, the gyroscope is made more effective and more sensitive throughout the indicating range.

Another object of the invention is to simplify construction by combining all pressure forces in the single instrument case containing the gyroscope. This enables a single connection from the Venturi or other source of pressure differential to provide both for operation of the rotor of the gyroscope and for operation of the pressure mechanism controlled by the gyroscope frame. This enables further, the combination with this single case, of pressure control valve, air filters and the like, as may be required or desirable for use with the gyroscope and the pressure mechanism.

Other objects of the invention are to enable any desired mounting of the indicator dial, irrespective of the gyroscope and if desired, the actuation of any number of indicators, for instance, in different parts of the ship, from the one gyroscope.

Another object of the invention is to provide an improved form of bank indicating means and particularly one which may be arranged in any desired location, independently of its actuating mechanism. Also, to enable any number of bank indicators being actuated from the one mechanism.

The foregoing and other desirable objects are attained by novel features of construction, combinations and relations of parts, as defined in the following specification and broadly covered in the claims.

The drawings accompanying and forming part of the specification illustrate certain practical commercial embodiments of the invention. The structure however may be modified and changed in various ways, all within the true intent of the invention as apparent from the scope of the claims.

Fig. 1 is a broken vertical sectional view illustrating the gyroscope and pressure mechanism of a combined instrument performing the functions of bank and turn and pitch and climb indications.

Fig. 2 is a broken sectional view as on line 2—2 of Fig. 1 and in continuation of that figure to show the indicator mechanism having the rate of turn pointer, the ball bank indicator and the pitch and climb pointer, all on the one dial.

Fig. 3 is a fragmentary sectional detail of the pressure valve mechanism, substantially as on line 3—3 of Fig. 1.

Fig. 4 is a part broken sectional view showing the pressure actuated bank indicator.

Fig. 5 is a partial side elevation broken away and in section, substantially as on line 5—5 of Fig. 4.

Fig. 6 is a broken sectional view illustrating details of the dial mechanism.

The gyroscope shown in Fig. 1, differs from the conventional design, in that the frame 7, carrying the rotor 8, is pivoted at 9, on an axis 10, which instead of being on the longitudinal axis or substantially parallel thereto, is inclined upwardly and forwardly, in respect to the longitudinal axis of the aircraft.

Provision for adjustment of the inclination of the gyroscope is made in the illustration by mounting the gyroscope case 11, on bearings 12, about which it may be rocked by hand screw 13, in engagement with a screw segment 14, on the side of the case.

The gyroscope frame is shown as carrying a downwardly projecting arm 15, engaging between shoulders 16, on a stem 17, carrying opposed valve elements 18, 19, movable in a cylindrical valve chamber 20, forming a portion of the instrument case and in communication therewith at the center by way of the slot 21, through which the arm 15 operates. The two valves are of light cylindrical shell construction having annular head portions 22, 23, separated by an annular reduced chamber forming portion 24.

Ports 25, 26, control communication between the interior of the gyroscope case and the intermediate chambered portions 24 of valves 18, 19, and ports 27, 28, provide communication between valve chambers 24 and the atmosphere through a common passage 29, Figs. 1 and 3, having inlet through an air filter 30.

Valve chambers 24 also are in communication with the cylindrical chamber 20, at the outer ends of the valves by the passages shown at 31, 32, Fig. 2.

From the ends of the valve cylinder 20, tubular connections 33, 34, extend to the indicator or other instrument. In the illustration, these differential pressure lines 33, 34, extend to the oppositely working expansible and collapsible opposed bellows 35, 36, connected by link 37, and the latter carries a pin 38, operating in a slot 39, in the upper end of the lever pivoted at 40, and carrying a gear segment 41, in mesh with pinion 42, on a spindle 43, carrying the turn indicating pointer 44.

At the inclination shown, the gyroscope will be sensitive to roll as well as to turn. With roll or turn to the right for example, frame 7 will precess to the left in Fig. 2, exerting force to displace the valves 18, 19, to the right to cause the outer head 22, of the left hand valve 18, to close or partly close port 27, and the inner valve head to open port 25. Chamber 24 of the left hand valve is thus cut off from atmosphere partly or wholly by closing of port 27 and opened to suction within the case by opening of port 25. The reverse operations take place at the right hand valve 19, where in such movement to the right, port 26 is being closed by inner valve head 23, while atmospheric port 28 is being opened by valve head 22. Chamber 24 in the right hand valve is thus being brought to more nearly atmospheric pressure, while chamber 24 of the left hand valve is being brought more nearly to the suction within the case.

With suction applied to the interior of the case, as by means of connection indicated at 45, to a Venturi or the like, it will be evident that the valve movement described will be opposed by the increased suction applied through port 25, valve chamber 24, and passage 31, to the outer head 22, of the left hand valve and by atmospheric pressure admitted to the outer head 22, of the right hand valve through atmospheric port 28, valve space 24 and passage 32. This also has the effect through differential pressures lines 33, 34, respectively of applying increased suction to the left hand bellows 35, and increased pressure to the right hand bellows 36, of the indicating instrument resulting in shift of the link 37, connecting the two in a left handed direction, with consequent swinging of the gear segment 41, to the right and rotative movement of pinion 42, to the right to throw the turn indicating pointer 44, toward the right, thus indicating right turn. With a bank or turning movement toward the left, the operation will be the reverse.

If the movement is a roll or bank at an improper angle, this action will be shown on the instrument by the ball bank indicator 46, Fig. 2, on the face of the same instrument.

Rate of climb indication is provided on the same dial, Figs. 2 and 6, by an expansible and collapsible bellows 47, having a capillary 48, or equivalent slow connection to atmosphere, as by way of opening 49, in the instrument case 50, and connected by link 51, with gear segment 52, engaging pinion 53, on spindle 54, carrying the pitch and climb pointer 55.

The combination indicating instrument, requiring only two differential air line connections 33, 34, with the gyroscopic instrument, may be located in any convenient position, and, if desired, any number of similar indicating instruments may be connected in parallel on the same differential pressure lines, thus to give indications at different stations in an aircraft from the one gyroscope. By restricting the precessional movement of the gyro to the small value needed for operation of the valve ports, the counterbalancing pneumatic force is a linear function of the rate of turn. Knowledge of actual flying conditions is therefore much more accurate and corrective measures whether done manually or automatically more intelligently made. Also in the conventional form of rate of turn instrument where a spring is used as the restoring force, it is necessary to add a damping device usually in the form of a piston to prevent oscillation, which additional equipment by this invention, is thus made unnecessary. By variably restricting passages 31 and 32 as by screws 80, 81, tendency to oscillate may be overcome.

The same principles of converting mechanical force to pressure and employing differential pressure for actuation of a remote indicator are applicable to bank indication purposes and the like, as particularly shown in Figs. 4 and 5, where there is indicated a pendulum weight 56, pivoted at 57, to swing on or substantially parallel to the longitudinal axis of the craft and connected at 58, to actuate valves 59, 60, similar in construction to those first described and connected by differential pressure lines 61, 62, with a more or less remote indicating instrument 63.

The pendulum 56 is shown as operating in a case 64, open to atmosphere through an air filter 65, to which suction is applied from a Venturi or the like, through a line 66, opening into the case through a manifold passage 67, provided with ports 68, 69, controlled by the inner head portions 23a of the valves 59, 60. Parts 70, 71, controlled by the outer valve heads 22a, govern communication between the annular valve spaces 24a, and the interior of the case and passages 31a, 32a, provide communication between such valve spaces and the outer heads of the piston valve elements.

With the construction shown, it will be apparent that upon improper banking movement to the right, the pendulum will tend to shift the valves toward the right for closing the atmospheric pressure port 70, and opening the left hand piston valve to suction through port 68, and passage 31a, with simultaneous closing of suction port 69 and opening of atmospheric port 71, to admit atmospheric pressure to the right hand piston head. There is thus at once established a pressure opposing the swinging effort of the pendulum and acting to apply greater suction through line 61, and reduced suction or more nearly atmospheric pressure through the line 62.

The differential pressure lines last mentioned are indicated in Fig. 4, as connected with opposed spring bellows 72, 73, which actuate a link 74, having a pin and slot connection at 75, with a gear segment 76, for operating pinion 77, on a spindle carrying the bank indicating pointer 78.

This differential pressure bank indicator, like the combination indicating instrument first described, may be located in any desired position, irrespective of the mounting of the bank sensitive mechanism and a number of such indicators may all be hooked up with the one bank sensitive mechanism.

Also in the bank indicator form of the invention, only a single suction connection to the instrument case is required. This is of particular advantage in the first embodiment of the invention, where the single suction connection serves for operation of the gyroscope rotor and for supplying the differential air force to counterbalance the rotor frame and to furnish power for operation of the differential indicating instrument or instruments.

The air release valve 79 is shown in Fig. 1, mounted directly on the gyroscope case for insuring constant rotative speed of the gyroscope. The valve mechanism in the gyroscope case constitutes of itself a pressure regulating means, automatically controlling the differential pressure on the pistons to a value exactly proportional to the gyroscopic force. Thus with the rotor speed constant, the counterbalancing pneumatic force of the valve mechanism opposed to the gyroscopic force is always proportional to the rate of turn or bank, or combination of both, which feature is particularly valuable both for indication and for control purposes.

What is claimed is:

1. In combination, an instrument case, a precessional gyroscope in said case provided with a precessional frame and with an air driven rotor mounted in said precessional frame, a suction connection to said case for effecting operation of said air driven rotor, said case having an air inlet and differential pressure passages, valve means in said case for controlling said air inlet and said differential pressure passages, mechanical connections between the precessional frame of the gyroscope and said valve means, whereby said valve means will be actuated by said gyroscope when the latter precesses and will oppose precession of the same, a differential pressure operated instrument and connections between said differential pressure passages and said instrument, means for pivotally supporting said instrument case on an axis substantially corresponding with the axis of rotation of the rotor and means for effecting accurate angular adjustments of said case about said axis.

2. A unitary instrument for aircraft, comprising an instrument case, a precessional frame journalled on an axis in said case, an air driven rotor journalled in said frame, for spinning about an axis at right angles to the frame axis, a jet nozzle for said rotor fixed in the casing, a valve chamber in said instrument case, means for applying suction to the interior of said case and to said valve chamber, a valve element operable in said chamber, differential pressure air passages in said instrument case, there being ports in said valve chamber governed by said valve element and providing communication between said differential pressure air passages and said applied suction and atmosphere, mechanical operating connections within said case from said precessional frame to said valve element, a differential pressure instrument connected with said differential pressure air passages and means for mounting said case with said axis of said precessional frame within the case on an upward and forward incline relative to the longitudinal direction of aircraft travel.

LUIS DE FLOREZ.